Figures 1, 2:
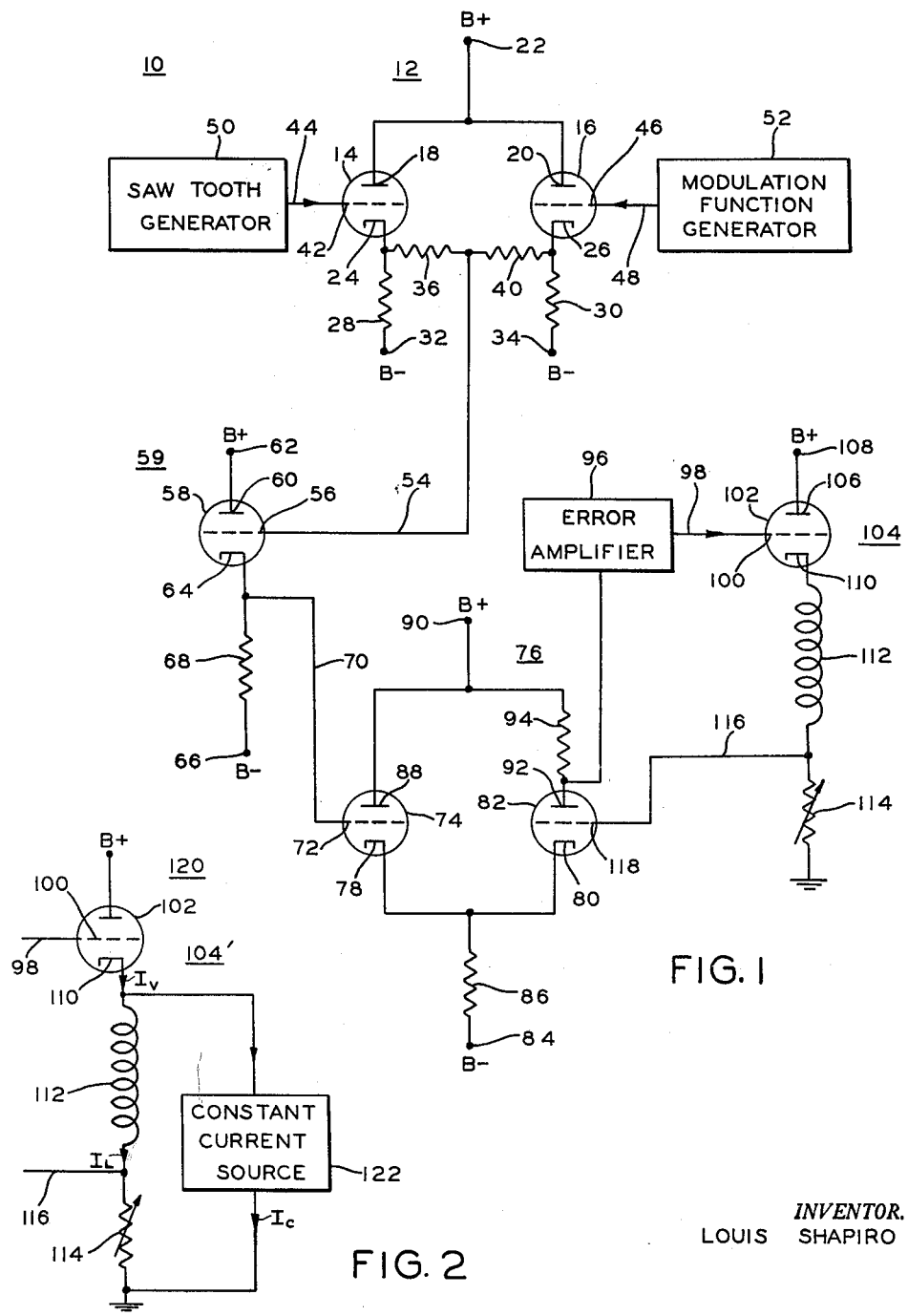

Jan. 12, 1965
L. SHAPIRO
3,165,675
APPARATUS FOR PRODUCING A MAGNETIC FIELD

Filed Sept. 29, 1960

*INVENTOR.*
LOUIS SHAPIRO

United States Patent Office 3,165,675
Patented Jan. 12, 1965

3,165,675
APPARATUS FOR PRODUCING A MAGNETIC FIELD
Louis Shapiro, Erlton, N.J., assignor, by mesne assignments, to First Pennsylvania Banking and Trust Company, trustee
Filed Sept. 29, 1960, Ser. No. 59,365
20 Claims. (Cl. 317—149)

The invention relates to apparatus for producing a magnetic field, and particularly for producing a magnetic field for a spin resonance system.

The prior art devices for producing magnetic fields for spin resonance systems have required the use of numerous coils or windings for producing the various components of the field in a particular given direction. The use of such numerous coils, windings and energizing means for producing the required composite magnetic field increases the complexity and cost of such systems.

Therefore it is a primary object of the invention to provide a new and improved apparatus for producing a magnetic field which minimizes the number of separate windings required and the apparatus utilized for energizing such windings.

Another object of the invention is to provide a new and improved apparatus for producing magnetic fields utilizing a single energizing circuit corresponding to a plurality of input signals.

Another object of the invention is to provide a new and improved apparatus for producing a magnetic field in a particular direction comprised of a plurality of components responsive to a plurality of input signals, and produced by a composite load current.

Another object of the invention is to provide a new and improved apparatus for producing a magnetic field which is particularly suitable for use in spin resonance systems.

Another object of the invention is to produce a new and improved apparatus for producing a magnetic field which is highly efficient in operation, requires a minimum number of components, and is inexpensive to produce and maintain.

The above objects as well as other objects of the invention are achieved by providing in one embodiment of this invention an apparatus comprising a signal combining means for receiving several respective input signals and delivering a composite control signal. A signal comparing means receives the control signal from the signal combining means and a comparison signal, and delivers an error signal to a current controlling means.

The current controlling means delivers the comparison signal to the comparing means responsive to the error signal for minimizing the error signal and provides a load current related to the comparison signal that is supplied to a winding for producing a magnetic field.

The current controlling means includes a plurality of impedance elements connected in series relationship across a current source. One of the impedance elements is a valve having a control electrode receiving the error signal for controlling the impedance of the valve and the load current through said impedance elements, while another of the impedance elements is a winding receiving the load current for producing the magnetic field, and still another of the impedance elements is a resistor receiving the load current for providing a comparison signal which is directly related to the load current. The resistance of the resistor may be adjustable for setting the amplitude of the comparison signal derived therefrom with respect to the amplitude of the load current.

The signal combining means may receive an input signal from a sawtooth generator and another signal from an alternating signal generator for providing a load current through the winding and thereby producing a magnetic field for a spin resonance system, which field has a unidirectional component which may be slowly varying and a low frequency alternating component.

The foregoing and other objects of the invention will become more apparent as the following detailed description of the invention is read in conjunction with the drawings, in which:

FIGURE 1 diagrammatically illustrates in schematic form an apparatus embodying the invention, and FIGURE 2 diagrammatically illustrates in schematic form a portion of the apparatus of FIGURE 1 which has been modified to provide reverse current for the magnetic field winding.

Like reference numerals designate like parts throughout the several views.

Referring to FIGURE 1, the apparatus 10 for producing a magnetic field comprises a signal combining or adding means 12 comprising valves 14, 16 with their anodes 18, 20 returned to a positive potential terminal 22, while their cathodes 24, 26 are returned through respective cathode load resistors 28, 30 to negative potential terminals 32, 34. The cathodes 24, 26 of valves 14, 16 are joined by series connected resistors 36, 40.

The control electrode 42 of valve 14 is provided with a signal input line 44, while the control electrode 46 of valve 16 is provided with a respective signal input line 48. The signal input lines 44, 48 of the signal combining means 12 receive signals for controlling respective components of the magnetic field produced by the apparatus 10.

The input line 48 receives signals from a modulation function generator 52, while the signal input line 44 receives signals from a saw tooth generator 50 to produce a magnetic field in a particular direction by the apparatus 10 for a spin resonance system, which field has a unidirectional component which may be slowly varying and has a low frequency alternating component.

The junction of the resistors 36, 40 of the signal combining or adding means 12 provides a composite signal of the input signals to the lines 44, 48. The composite signal is delivered over line 54 to the control electrode 56 of valve 58 of a cathode follower circuit 59 of the signal combining means 12. The valve 58 has its anode 60 directly returned to positive potential terminal 62, while its cathode 64 is returned to negative potential terminal 66 through the cathode load resistor 68.

A control signal from the cathode 64 of valve 58 is delivered over a line 70 to the control electrode 72 of the valve 74 of the signal comparing means 76. The cathode 78 of valve 74 is joined to the cathode 80 of the valve 82 of the signal comparing means 76 and returned to a negative potential terminal 84 through their common cathode resistor 86. The anode 88 of valve 74 is directly returned to a positive potential terminal 90 while the anode 92 of valve 82 is connected to the terminal 90 through an anode resistor 94.

The error signal developed on the anode 94 of valve 82 is received by an error amplifier 96 which delivers an output signal over line 98.

The output signal on the line 98 is received by the control electrode 100 of the valve 102 of a current controlling means 104. The anode 106 of valve 102 is joined directly to positive potential terminal 108, while its cathode 110 is returned to ground potential through a winding 112 connected in series with a resistor 114. Current passing through the winding 112 produces the magnetic field of the apparatus 10, while the voltage drop resulting from the current passing through the resistor 114 provides the comparison signal at the junction of the winding 112 and resistor 114 which is delivered over line 116 to the control electrode 118 of valve 82 of the signal comparing means 76. The resistor 114 has a resistance which may be set to adjust the voltage drop produced by the current through the resistor 114 and consequently the signal delivered to the control electrode 118 of the valve 82 responsive to the current therethrough.

In operation, the signals delivered to the input lines 44, 48 of the signal combining or adding means 12 provide a composite signal over line 54 to the cathode follower circuit 59. The corresponding signal at the cathode 64 of the circuit 59 provides a control signal which is delivered over line 70 to the control electrode 72 of the valve 74 of the signal comparing means 76.

With positive-going signals, for example, delivered to the input lines 44, 48 of the signal combining means 12, the cathode follower circuit 59 receives a positive-going signal and delivers a positive-going control signal to the input electrode 72 of valve 74.

Since the control electrode 72 goes more positive in potential, the valve 74 becomes more conductive tending to increase the voltage drop across the cathode resistor 86 and raise the potential on the cathodes 78 and 80 of valves 74, 82. The increase in the potential of the cathode 80 with respect to the control electrode 118 of valve 82 reduces the conduction of the valve and provides a positive-going signal at its anode 92 which is amplified by the error amplifier 96.

The error amplifier 96 provides a positive-going signal to the control electrode 100 of valve 102, increasing its conduction and the current through the winding 112 in series with the resistor 114.

The increased voltage drop across resistor 114 provides a positive-going signal to the control electrode 118 tending to increase the conduction of the valve 82 for minimizing the positive-going error signal on the anode 92. The negative feedback arrangement thereby increases the potential level on the control electrode 118 of valve 82 for minimizing the error signal to the amplifier 96. This results in the increase in the potential level on the control electrode 118 of valve 82 until it is substantially equal to the potential of the control electrode 72 of valve 74.

If the control signal over line 70 is negative-going, the signal comparing means 76 similarly produces a negative-going error signal to the amplifier 96 which delivers a negative-going signal to the control electrode 100 of valve 102 reducing its conduction. The conduction of valve 102 is reduced to the point where the comparison signal over line 116 to the control electrode 118 of valve 82 goes sufficiently negative to minimize the error signal to the amplifier 96, at which time its voltage level is substantially equal to the voltage level on the control electrode 72 of the valve 74.

The control signal on line 70 which is a composite signal resulting from the addition of the input signals to lines 44 and 48 of the signal combining means 12, produces a current in the winding 112 which is directly related to the composite signal. This is so because the voltage drop across the resistor 114 which is caused to follow the composite signal is equal to the resistance of the resistor 114 multiplied by the current therethrough, making it directly related to the current through the winding 112 and since substantially the same current flows through the winding 112 and resistor 114 due to the insignificant grid current of the valve 82. Since the resistance of the resistor 114 may be varied, the ratio of the comparison signal voltage on line 114 to the current through resistor 114 and winding 112 may be set.

It is noted that the current of winding 112 which produces the magnetic field in a particular direction is directly related to the control signal 70 delivered to the comparing network 76 since the comparison signal on line 116 follows the control signal on line 70. The control signal on line 70, however, may be made of a plurality of component signals which are provided to the input lines 44, 48 of the signal combining means 12. Thus, the current through the winding 112 provides a magnetic field having a respective component controlled by the signal to the input line 44 and a respective component controlled by the signal on line 48. Thus, the input signals delivered by the modulation function generator 52 and the saw tooth generator 50 provide a field with a unidirectional component which may vary slowly with time and with an alternating component.

Such a magnetic field is thus provided with the use of one winding 112 energized by a single current source with associated control apparatus, an advance over the prior art wherein a plurality of windings requiring respective associated energizing means and controlling signals for separately producing the several components of the magnetic field. Such prior arrangement is inefficient in operation, high in cost, and complex in operation requiring alignment of coils or windings for producing appropriate required results.

Although the signal combining or adding means 12 is disclosed with two input lines 44, 48, it is apparent that a multiplicity of such input lines may be provided for producing a composite signal with a magnetic field having respective components corresponding to the several input signals. Of course, the winding 112 may be supplemented by other windings such as that for producing the radio frequency field in another direction which is also utilized in the spin resonance apparatus disclosed by F. Bloch et al. in U.S. Patent No. 2,561,489.

FIGURE 2 diagrammatically illustrates a modified form of apparatus 120 which differs from the apparatus 10 by providing its current controlling means 104 with a constant current source 122. The constant current source 122 delivers current $I_c$ to ground potential and receives current $I_c$ from the junction of the cathode 110 and the winding 112 of the current controlling means 104'.

It is noted that the current $I_v$ through the valve 102 is equal to the current $I_L$ through the winding 112 plus the current $I_c$ received by the constant current source. From this relationship it is noted when the current $I_c$ is less than the current $I_v$, the current $I_L$ through the winding 112 has a positive sense, whereas when the current $I_c$ is greater than the current $I_v$, the current $I_L$ has a negative sense.

In applications such as electron spin resonance investigation it is often desirable to investigate spectra resulting entirely from the interaction of internal molecular or crystalline fields with paramagnetic ions. Under these conditions alternating current components (i.e. components of reversing polarities, due to the peak alternating current being greater than the direct current) rather than single direction current components are desired for passage through the winding 112. The modified form of the apparatus 120 shown in FIGURE 2 including the constant current source 122 allows for current reversal through winding 112 to the extent required by the maximum negative peak of the signal provided by the generator 52.

While this invention has been described and illustrated with reference to a specific embodiment, it is to be understood that the invention is capable of various modifications or applications, not departing essentially from the spirit thereof, which will become apparent to those skilled in the art.

What is claimed is:

1. Apparatus for producing a magnetic field comprising means for producing a control signal, a signal comparing means for receiving said control signal and a comparison signal and for delivering an error signal; a winding for producing a magnetic field; and a current controlling means for delivering a load current to said winding responsive to said error signal and for delivering a comparison signal to said comparing means, said current controlling means including a valve having a control electrode for receiving said error signal and for controlling an impedance of said valve in accordance therewith, said winding being in series with the impedance of said valve, and a resistor receiving said load current for providing said comparison signal which is directly related to said load current.

2. Apparatus for producing a magnetic field comprising a signal comparing means for receiving a control signal and a comparison signal and for delivering an error signal; signal combining means for receiving several respective input signals and delivering a composite control signal to said signal comparing means; a winding for producing a magnetic field; and a current controlling means for delivering a load current to said winding responsive to said error signal and for delivering a comparison signal to said comparing means, said current controlling means including a valve having a control electrode for receiving said error signal and for controlling an impedance of said valve in accordance therewith, said winding being in series with the impedance of said valve, and a resistor for receiving said load current and for providing said comparison signal in direct relation to said load current.

3. In a spin resonance system, apparatus for producing a magnetic field comprising a signal comparing means for receiving a control signal and a comparison signal and for delivering an error signal; signal combining means for receiving several respective input signals and delivering a composite of said input signals as a control signal to said signal comparing means; a sawtooth function generator and an alternating signal generator for delivering said respective input signals to said signal combining means; a winding for producing a magnetic field; and a current controlling means for delivering a load current to said winding responsive to said error signal and for delivering a comparison signal to said comparing means, said current controlling means including a valve having a control electrode for receiving said error signal and for controlling an impedance of said valve in accordance therewith, said winding being in series with the impedance of said valve and producing a magnetic field having a slowly varying unidirectional component and a low frequency alternating component, and a resistor for receiving said load current and for providing said comparison signal in direct relation to said load current.

4. Apparatus for producing a magnetic field comprising a signal comparing means for receiving an information signal and a comparison signal and delivering an error signal; a winding for producing a magnetic field; and a current controlling means including a plurality of impedance elements connected in series relationship with said winding across a current source, one of said impedance elements having its impedance controlled by said error signal and including a valve having a control electrode receiving said error signal, and anode and cathode electrodes connected in series with said winding and another of said impedance elements for supplying load current thereto responsive to said error signal, said other impedance element including a resistor receiving said load current for providing said comparison signal which is directly related to said load current.

5. The apparatus of claim 4 in which said resistor has an adjustable resistance for setting the amplitude of said comparison signal with respect to the amplitude of said load current.

6. Apparatus for producing a magnetic field comprising a signal comparing means for receiving an information signal and a comparison signal and delivering an error signal; signal combining means receiving several respective input signals and delivering a composite control signal as said information signal to said signal comparing means; a winding for producing a magnetic field; and a current controlling means including a plurality of impedance elements connected in series relationship with said winding across a current source, one of said impedance elements having its impedance controlled by said error signal and including a valve having a control electrode receiving said error signal, and anode and cathode electrodes connected in series with said winding and another of said impedance elements for supplying load current thereto responsive to said error signal, said other impedance element including a resistor receiving said load current for providing said comparison signal in direct relation to said load current.

7. Apparatus for producing a magnetic field comprising a signal combining means receiving several respective input signals and delivering a composite control signal; a signal comparing means receiving said control signal from said signal combining means and a comparison signal and delivering an error signal in response thereto; and a current controlling means including a plurality of impedance elements connected in series relationship across a current source, one of said impedance elements including a winding, said current controlling means being responsive to said error signal for delivering a load current to another of said impedance elements and to said winding to produce a magnetic field and for delivering said comparison signal related to said load current from said other impedance elements to said comparing means to minimize said error signal.

8. The apparatus of claim 7 in which another one of said impedance elements has its impedance controlled by said error signal for controlling said load current and thereby said comparison signal.

9. Apparatus for producing a magnetic field comprising a signal combining means receiving several respective input signals and delivering a composite input signal; a signal comparing means receiving said control signal from said signal combining means and a comparison signal and delivering an error signal in response thereto; and a current controlling means including a plurality of impedance elements connected in series relation across a current source and responsive to said error signal for providing a load current to a first one of said impedance elements to deliver said comparison signal directly related to said load current to said comparing means for minimizing said error signal, a second one of said impedance elements being a winding receiving said load current for producing said magnetic field, a third one of said impedance elements having its impedance controlled by said error signal to control said load current and thereby said comparison signal, said third impedance element including a valve having a control electrode receiving said error signal, and anode and cathode electrodes for connecting said valve in series with said remaining impedance elements.

10. The apparatus of claim 9 in which said first one of said impedance elements is said resistor receiving said load current for providing a comparison signal.

11. Apparatus for producing a magnetic field for a spin resonance system comprising a signal combining means receiving several respective input signals and delivering a composite input signal; a signal comparing means receiving said control signal from said signal combining means and a comparison signal and delivering an error signal in response thereto; a current controlling means including a plurality of impedance elements connected in series relation across a current source and responsive to said error signal for providing a load current to a first one of said impedance elements to deliver said comparison signal directly related to said load current to said comparing means for minimizing said error signal, a second one of said impedance elements is a winding receiving said load current for producing said magnetic field, a third one of said impedance elements having its impedance controlled by said error signal to control said load current and thereby said comparison signal, said third impedance element including a valve having a control electrode receiving said error signal, and anode and cathode electrodes for connecting said valve in series with said remaining impedance elements; and a sawtooth function generator and an alternating signal generator delivering respective input signals to said signal combining means whereby said load current through said winding produces a magnetic field having a unidirectional component which may be slowly varying and a low frequency alternating component.

12. For use in a spin resonance system having means for producing a high frequency magnetic field, apparatus for producing a varying magnetic field having a varying unidirectional component and a low frequency alternating component, said apparatus comprising a winding for producing the varying magnetic field, a source of a varying unidirectional signal, a source of an alternating signal, signal combining means coupled to said unidirectional signal source and to said alternating signal source and supplying an output signal which is a combination of said unidirectional and alternating signal, and means coupled to said signal combining means for supplying a varying current through said winding in accordance with said combination signal, whereby the magnetic field produced by the current through said winding varies in response to said combination of unidirectional and alternating signals.

13. For use in a spin resonance system having means for producing a high frequency magnetic field, apparatus for producing a low frequency varying magnetic field, said apparatus comprising a winding for producing the low frequency magnetic field, means for supplying a control signal having a slowly varying unidirectional component and a low frequency alternating component, comparing means for receiving said control signal and a comparison signal for supplying an output signal in accordance with the difference between the received signals, means responsive to said difference output signal for supplying a varying current to said winding, and means for deriving a signal in accordance with the current in said winding and for delivering the derived signal as said comparison signal to said comparing means to minimize said difference signal, whereby the load current through said winding and the magnetic field produced thereby is varied in accordance with said control signal.

14. For use in a spin resonance system having means for producing a high frequency magnetic field, apparatus for producing a low frequency varying magnetic field, said apparatus comprising a winding for producing the low frequency magnetic field, means for supplying a control signal, comparing means for receiving said control signal and a comparison signal for supplying an output signal in accordance with the difference between the received signals, means responsive to said difference output signal for supplying a varying current to said winding, and impedance means in series with said winding for deriving a signal in accordance with the current in said winding and for delivering the derived signal as said comparison signal to said comparing means to minimize said difference signal, whereby the load current through said winding and the magnetic field produced thereby is varied in accordance with said control signal.

15. For use in a spin resonance system having means for producing a high frequency field, apparatus for producing a low frequency alternating magnetic field, said apparatus comprising a winding for producing said alternating field, means for supplying an alternating signal, means connected in a parallel path with respect to said winding for supplying a unidirectional constant current to said winding, and unidirectional means for supplying to said winding and constant current means a current that varies in accordance with said alternating signal and in amplitude to be sometimes greater than and sometimes less than the current of said constant current means.

16. Apparatus according to claim 2 wherein said valve, winding, and resistor are coupled in series, and a constant current source is coupled in parallel with said winding and resistor.

17. The apparatus of claim 10 wherein a constant current source is coupled in parallel with said winding and resistor.

18. Apparatus for producing an alternating magnetic field comprising means for supplying an alternating control signal, means for comparing said alternating signal and a comparison signal and for producing an error signal in accordance with the difference therebetween, a winding for producing said magnetic field, unidirectional means connected to said winding for supplying a current in one direction to said winding in accordance with said error signal, means connected to said winding for supplying a unidirectional current in the opposite direction to said winding, and means for deriving said comparison signal in accordance with the current in said winding and for delivering it to said comparing means.

19. Apparatus in accordance with claim 18 wherein said means for supplying the opposite direction current includes a constant current source connected in a parallel path with respect to said winding.

20. Apparatus in accordance with claim 19 wherein said means for producing said comparison signal includes an impedance connected in series with said winding to receive the current supplied thereto.

References Cited in the file of this patent

UNITED STATES PATENTS

| | | |
|---|---|---|
| 2,250,708 | Herz | July 29, 1941 |
| 2,561,489 | Bloch et al. | July 24, 1951 |
| 2,668,921 | Lash | Feb. 9, 1954 |
| 2,996,658 | Kirchner et al. | Aug. 15, 1961 |
| 3,068,398 | Shoolery et al. | Dec. 11, 1962 |